Nov. 13, 1956     R. J. SMITH     2,770,508
CAM FOLLOWER BEARING
Filed March 7, 1955
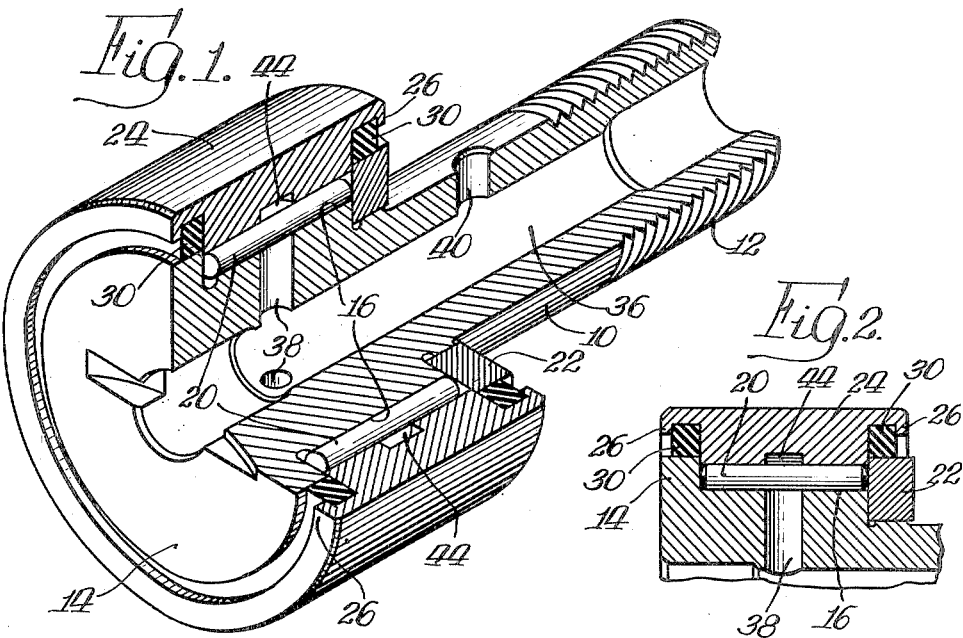
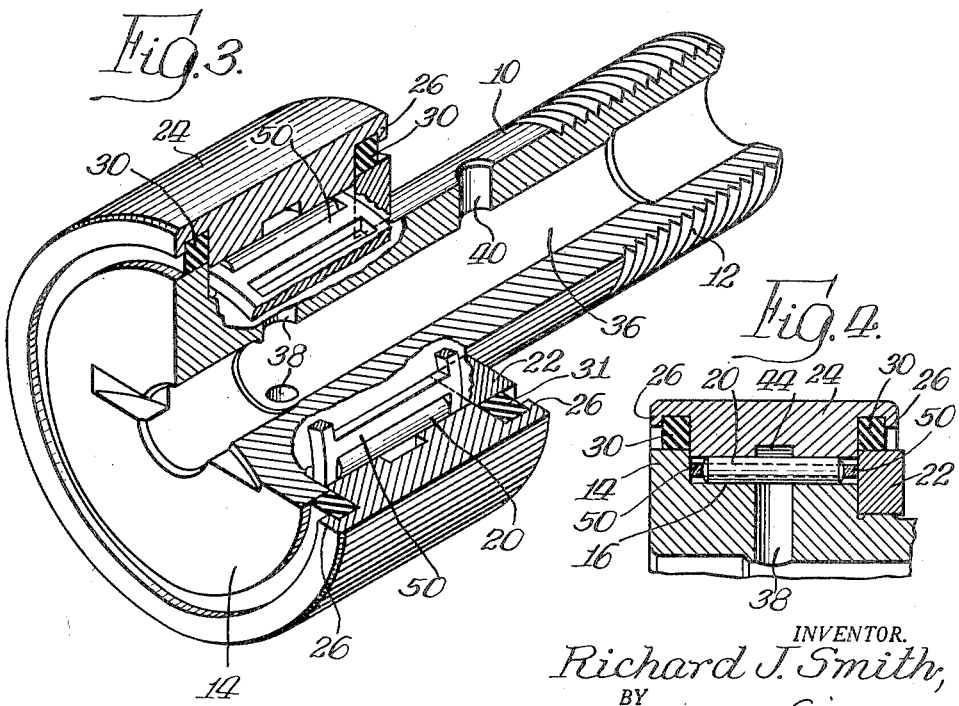
INVENTOR.
Richard J. Smith,
BY Mueller & Aichele
Atty's.

United States Patent Office 2,770,508
Patented Nov. 13, 1956

2,770,508

CAM FOLLOWER BEARING

Richard J. Smith, Valparaiso, Ind., assignor to McGill Manufacturing Company, Inc., Valparaiso, Ind., a corporation of Indiana Application March 7, 1955, Serial No. 492,680

2 Claims. (Cl. 308—187.1)

This invention relates generally to bearing assemblies, and more particularly to an improved sealed roller bearing assembly of the cam follower type.

Cam follower bearings, such as disclosed in United States Patent No. 2,099,660, have proved extremely popular in the bearing art. It has also been realized that the usefulness of this type of bearing can be even further enhanced by the provision of a suitable unit of this type with a sealed construction. However, two things have chiefly stood in the way of such a construction. The first is the fact that in cam follower operation, the loads are extremely light and any increase in seal friction torque has a tendency to cause the outer race to stick and slide on the mating cam. Therefore, if a sealed construction is to be resorted to, it must be one in which the seals do not produce any appreciable additional running friction. Another factor standing in the way of sealed construction in cam follower bearings is the limited lubricant storage capacity of this type of bearing. It is evident that a sealed bearing of any type must have a degree of prelubricated life, or else the sealed construction is not worthwhile pursuing from a practical standpoint.

It is accordingly, an object of the present invention to provide a sealed bearing of the cam follower type which is constructed so as to overcome the difficulties outlined above.

A more particular object of the present invention is to provide an improved sealed bearing of the cam follower type in which the sealing structure imparts negligible additional running friction to the assembly.

Another particular object of the invention is to provide such an improved sealed cam follower bearing which is constructed to have a sufficiently long prelubricated life so as to render the unit commercially feasible.

A feature of the invention is the provision of an improved cam follower bearing including annular seals retained in a manner to be described and extending into counterbores in the outer race of the bearing in labyrinth relation therewith so as to provide a sealed construction that does not add materially to the running friction of the bearing, and including an annular groove formed in the bore of the outer race for increased lubricant capacity.

Another feature of the invention is the provision of such a cam follower bearing of the roller type, and which includes rollers separated by a cage retainer having a radial thickness substantially less than the rollers so as to increase the lubricant capacity of the bearing, as an alternate to the groove referred to above.

Further objects, features and attending advantages of the invention will be apparent upon consideration of the following description when taken in conjunction with the accompanying drawings in which:

Fig. 1 is a perspective cut-away view of a cam follower bearing constructed in accordance with the invention;

Fig. 2 is a sectional view of the bearing of Fig. 1;

Fig. 3 is a cut-away view of an alternate embodiment of the invention; and

Fig. 4 is a sectional view of the bearing of Fig. 3.

The cam follower bearing of the present invention includes a stud member having a circular head plate or flange and a bearing surface adjacent the flange. Rollers are disposed on the bearing surface, and each roller is retained at one end by the flange and at the other end by an annular retainer plate secured to the stud member. A lubricant duct extends through the center of the stud longitudinally thereof, and this duct is connected to the bearing surface by means of one or more radial apertures extending to the bearing surface to permit the flow of lubricant to the rollers from the lubricant duct. An outer race encloses the rollers and has a pair of annular lipped portions respectively extending over the head plate and the retainer plate and with a counterbore in the inner surface of the outer race adjacent each of the lipped portions. An annular lubricant retaining groove or reservoir is formed in the bore of the outer race adjacent the rollers in order to increase the lubricant capacity around the rollers. The lubricant is retained within the bearings by means of a pair of annular seals respectively retained by the end plate and retainer plate over which they are mounted in a tight friction fit, with the seal extending into the respective counterbores in a labyrinth engagement and not actually in contact with the outer race so that a sealed construction is effected without increasing materially the running friction of the bearing. In a second embodiment, a roller retaining cage is used to space the rollers and provide lubricant storage capacity, without the necessity for the lubricant retaining groove referred to above.

The roller bearing cam follower of Fig. 1 includes a stud member 10 with a threaded portion 12 at one end thereof so that the entire bearing may be secured to a suitable arm for transfer of power. Member 10 also has an integral circular head plate or flange 14 at one end, and adjacent this head plate there is a bearing surface 16 of lesser diameter than the outer diameter of plate 14. A plurality of rollers 20 are disposed about the stud member 10 on the bearing surface 16, and the rollers are retained in position by means of the head plate 14 and a retainer plate 22, the latter plate being in press-fit engagement with stud member 10 and having the same outer diameter as the head plate. An outer race 24 is bridged between plates 14, 22 and furnishes a surface against which a cam may bear in order to transmit the desired motion. The inner surface of outer race 24 encloses and bears upon the rollers 20. Each end of the bore of the outer race is counterbored. The outer race is retained against longitudinal movement by plates 14 and 22 which embrace the central portion of the bore of the outer race.

The counterbores of the outer race have lipped-over portions 26 into which a pair of annular disc-like seals 30 extend. As shown, the seals 30 have a rectangular cross section and may be composed, for example, of felt, leather or rubber. The seals are mounted tightly on the periphery or rim of flange or head plate 14 and on the periphery or rim of retainer plate 22 and are fitted to these members. The outer lips of the seals extend into the respective counterbores of the outer race in a multiple labyrinth relation therewith. As previously noted, the seals do not actually contact the outer race to any appreciable extent so that the running friction of the bearing is not materially increased.

As previously noted, seals 30 may be composed of leather and when such is the case, rubber impregnated leather is preferred so as to render the seal impervious to attack by the various greases or other lubricants retained thereby. Due to the highly efficient sealing capacities of the disclosed sealed bearing, it is desirable to include a vent for the lubricant in each of the seals. With such vents, the likelihood of the seals being blown out during re-lubrication is materially reduced. These vents are usually of V-shaped configuration extending through the seal.

Lubrication for rollers 20 is provided through the axial lubricant duct 36 which extends through the center of stud member 10 and which is in communication with the bearing surface 16 by means of radial apertures 38. A suitable lubricant may be introduced into either end of the lubricant duct or through a radial aperture 40, in the manner described in the assembly of the patent referred to previously herein. In actual practice, it is preferable to plug both ends of the duct as well as aperture 40 and to introduce the lubricant through the most convenient aperture after which it may be re-plugged to prevent loss of the lubricant.

While a considerable amount of oil or grease will be conducted to the rollers by aperture 38, in many applications it is desirable that quantities of lubricant be readily available about rollers 20. Therefore, a reservoir or annular lubricant groove 44 is provided in the bore of the outer race in a position so that it communicates with all the rollers. It is apparent that the groove provides greatly increased storage capacity for the lubricant which is readily accessible to all the rollers. Moreover, the lubricant is effectively contained within the bearing by the simple sealed construction described above.

Due to the particular construction of the bearing disclosed herein, the provision of groove 44 in outer race 24 does not detract from the overall load capacity of the bearing. This is because the outer race is rotating and the loads are concentrated on only a small portion of the raceway of the stationary inner race, so that the capacity of the outer race is normally not fully utilized when the inner race is fully loaded. Therefore, the annular groove 44 may be given suitable dimensions so as to equalize the capacities of the outer and inner races without affecting the overall load capacity of the bearing.

The cam follower of Fig. 3 is similar to that of Fig. 1 except that a bearing retainer cage 50 is employed, instead of groove 44, to increase the lubricant storage capacity of the bearing by separating the rollers from one another. It is apparent that with the thickness of the retainer cage 50 being considerably less than the diameter of a roller and with the spacing between the rollers being increased by the cage bars, more lubricant may be stored in the area between such bars and the outer race, and between such bars and the bearing surface.

The invention provides, therefore, a bearing assembly of the cam follower type which is constructed to have suitable lubricant storage so as to render sealing feasible, and which incorporates an improved sealing assembly that effectively and efficiently seals the bearing to retain lubricant therein and to exclude dirt and extraneous matter therefrom and which sealing construction does not add in any appreciable extent to the running friction of the bearing.

I claim:
1. A sealed cam follower type bearing including in combination a one-piece stud member having a circular head plate at the outside end thereof, an inner raceway portion adjacent the head plate of lesser diameter than the head plate, and lubricating duct-means opening into said inner raceway portion, an annular retainer plate fixedly carried on said stud member at the inside end of said inner raceway portion, a cylindrical outer race ring retained against longitudinal movement by said head plate and said retainer plate and having thereon a central portion as the outer raceway for the bearing, said outer race ring having an annular groove at each end of said raceway portion and each groove being formed at its outer end by an annular flange of the outer race ring and at its inner end by the outer raceway portion, each of said annular flanges having an annular edge of greater diameter than the diameter of the outer raceway portion and each said groove being of greater diameter at its base than the diameter of the annular edge of the adjacent flange, rollers in the bearing confined between the two raceway portions, and means cooperating with said annular grooves and with said annular flanges and acting when the bearing is installed in an operating apparatus to store at said rollers lubricants fed through said duct-means and to minimize the introduction of dirt into the bearing at the rollers, said cooperating means including a first annular non-metal sealing member maintained in a press-fit on the circumference of said head plate and a second annular non-metal sealing member maintained in a press-fit on the circumference of said retainer plate, with each of said two sealing members as maintained on the stud member being of a size as to extend into a respective one of said grooves in the outer race ring so as to substantially fill the groove but each of said two sealing members adapted to be in a sliding relation with its respective groove when the bearing is installed in an apparatus and there is relative rotation between said outer race ring and said stud member.

2. A sealed cam follower type bearing including in combination a stud member having an inner raceway portion thereon and lubricating duct-means opening into said inner raceway portion, a cylindrical outer-race-ring member supported for rotation on said stud member but retained against longitudinal movement thereon and having therein a central raceway portion positioned concentrically with respect to said inner raceway portion in the bearing, with one of said two members having a pair of annular grooves therein with each annular groove defined on the inside edge by the raceway portion of said one member and having an annular flange on the outside edge to define the groove on that edge whereby to provide on said one member a raceway portion and two grooves with one of said grooves on each side of the raceway portion, rollers in the bearing confined between said two raceway portions, and means cooperating with said annular grooves and with said annular flanges and acting when the bearing is installed in an operating apparatus to store at said rollers lubricant fed through said duct-means and to minimize the introduction of dirt into the bearing at the rollers, said cooperating means including a pair of annular non-metal seals each of which is rectangular in transverse cross section and of a transverse width corresponding generally to the transverse width of one of said annular grooves in said one member, with said seals each being mounted in a press-fit on the other of said members at opposite ends of the raceway portion of said other member, and with each of said annular non-metal seals having an outside diameter such that the seal extends into a corresponding one of said annular grooves on the one member so as to substantially fill the groove but so that it is in a sliding relation with said corresponding groove when the bearing is in an installation and there is relative rotation between said outer-race-ring member and said stud member.

References Cited in the file of this patent
UNITED STATES PATENTS

| | | |
|---|---|---|
| 182,641 | Clark | Sept. 26, 1876 |
| 1,404,939 | Dohner et al. | Jan. 31, 1922 |
| 1,958,412 | Andrada et al. | May 15, 1934 |
| 2,099,660 | Robinson | Nov. 16, 1937 |
| 2,590,422 | Large | Mar. 25, 1952 |